(12) United States Patent
Espejo (10) Patent No.: US 6,173,657 B1
(45) Date of Patent: Jan. 16, 2001

(54) PLASTIC PALLET ASSEMBLY AND METHOD OF ASSEMBLING SAME

(75) Inventor: Gilbert B. Espejo, Dumont, NJ (US)

(73) Assignee: Ashland, Inc., Dublin, OH (US)

( * ) Notice: Under 35 U.S.C. 154(b), the term of this patent shall be extended for 0 days.

(21) Appl. No.: 09/211,724

(22) Filed: Dec. 14, 1998

(51) Int. Cl.$^7$ .............................. B65D 19/26; B65D 19/32; B32B 31/24
(52) U.S. Cl. ................... 108/51.11; 108/501; 156/272.4; 156/275.7; 156/293
(58) Field of Search .............................. 156/272.4, 273.7, 156/273.9, 275.7, 293, 308.2, 309.6; 108/51.11, 57.25, 57.33, 901; 206/386, 599; 248/346.02; 219/633, 634

(56) References Cited

U.S. PATENT DOCUMENTS

| | | | |
|---|---|---|---|
| 2,393,541 | * 1/1946 | Kohler | 156/272.4 |
| 3,620,875 | * 11/1971 | Guglielmo | 156/272.4 |
| 3,664,271 | * 5/1972 | Wolder et al. | 108/901 |
| 3,680,496 | * 8/1972 | Westlake, Jr. | 108/901 |
| 4,735,154 | * 4/1988 | Hemery | 108/56.1 |
| 5,868,080 | * 2/1999 | Wyler et al. | 108/57.25 |

* cited by examiner

Primary Examiner—Michael W. Ball
Assistant Examiner—Michael A Tolin
(74) Attorney, Agent, or Firm—Clifford G. Frayne (57) ABSTRACT

A plastic pallet assembly having a load member with a flat load surface and a plurality of pillars depending therefrom wherein the pillars are shaped to conform to grooves in a plastic base member wherein the grooves are lined with an electromagnetic thermoplastic bonding material and thereafter subjected to an electromagnetic field to cause the thermoplastic electromagnetic bonding material to flow and subsequently set and secure the load and base members together thereby forming the plastic pallet assembly.

3 Claims, 7 Drawing Sheets

PLASTIC PALLET ASSEMBLY AND METHOD OF ASSEMBLING SAME

BACKGROUND OF THE INVENTION

1. Field of Invention

This invention relates to a plastic pallet assembly and method for manufacturing same and more particularly to a method of assembling a plastic pallet utilizing thermoplastic electromagnetic bonding techniques and the resulting plastic pallet assembly produced thereby.

2. Description of the Prior Art

Wooden pallets are used in commerce for a variety of purposes including the transportation by truck, railroad car or airplane of bulk material positioned on pallets. With the advent of large discount warehouses, many home products, such as the paper goods and can goods are sold in bulk in such warehouse stores directly off the pallet on which the goods have been shipped. Wooden pallets typically have a life span of three to six months before general wear and tear caused by fork lifts and exposure to weather conditions cause wooden pallets to rapidly deteriorate to a state of uselessness.

Pallets formed of a plastic material would be substantially immune from exposure to adverse weather conditions and would stand up better to the transportation by fork lift. Heretofore, the drawback with respect to plastic pallets was the inability to mold a light weight plastic pallet durable enough to stand up to the rigors of transportation and weather and to meet the strength and rigidity standards of the industry. It was readily recognized because of pallet configurations and mold considerations that a one piece pallet was not commercially viable. Thus, there is a long felt need for a rigid, light weight plastic pallet assembly able to withstand the rigors of handling during transportation as well as the adverse effects of weather.

OBJECTS OF THE INVENTION

An object of the present invention is to provide for a novel plastic pallet for industrial and commercial usage.

A further object of the present invention is to provide a method for forming a plastic pallet utilizing thermoplastic, electromagnetic bonding techniques.

A still further object of the present invention is to provide for a method for assembling a plastic pallet adjustable to accommodate pallets of varying size and configuration.

SUMMARY OF THE INVENTION

These and other objects of the present invention are achieved by a molded plastic pallet assembly comprised of a molded plastic base member and a molded plastic load member having a flat load surface and a plurality of pillars depending therefrom wherein the pillars are shaped to conform to grooves in the plastic base member and wherein the grooves are lined with an electromagnetic bonding material and thereafter subjected to an electromagnetic field to cause the electromagnetic bonding material to flow and subsequently set to secure the load and base members together thereby to form the plastic pallet assembly.

BRIEF DESCRIPTION OF THE DRAWINGS

These and other objects of the present invention will more readily become evident from the following detailed description particularly when taken in light of the drawings wherein.

DETAILED DESCRIPTION OF THE DRAWINGS

Figure 1:
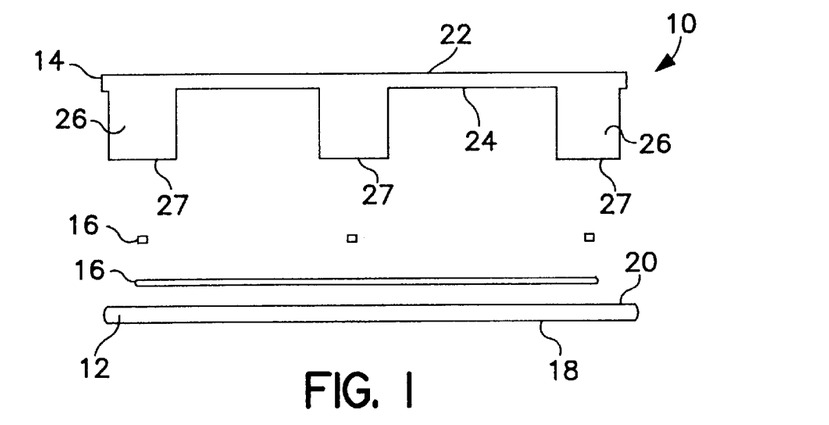
FIG. 1 is a schematic side exploded view of the pallet assembly of the present invention.
Figure 2:
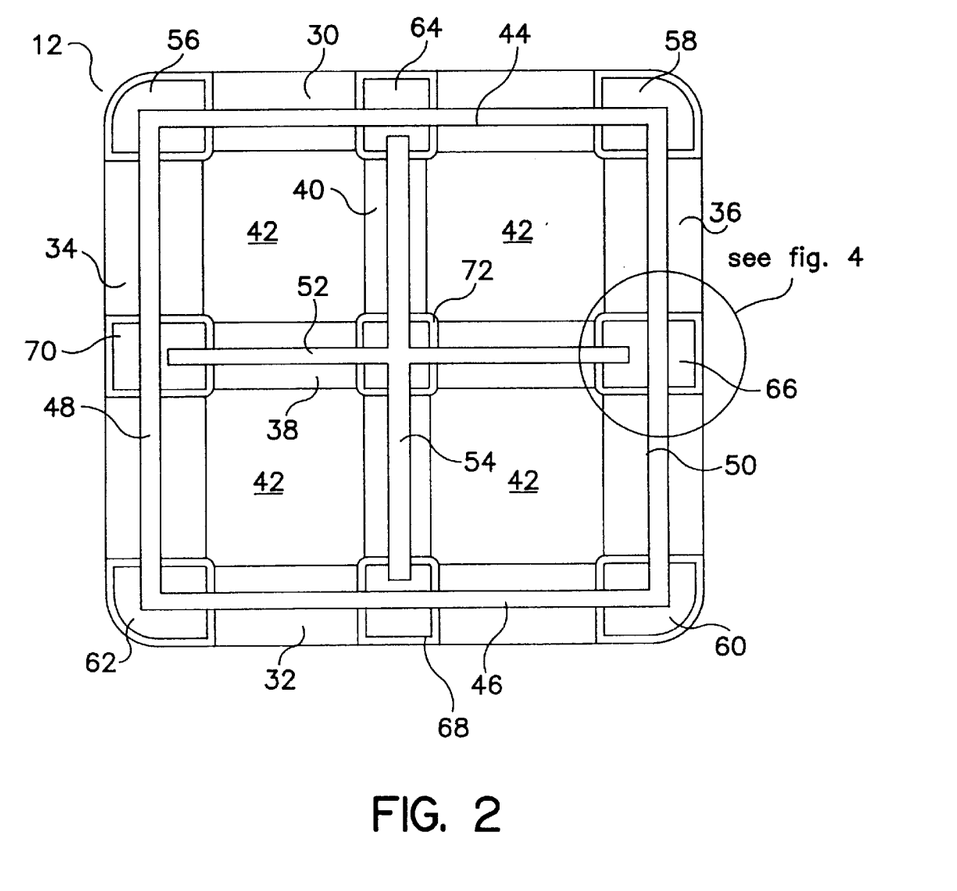
FIG. 2 is a top view of the base member of the pallet assembly of the present invention.
Figure 3:
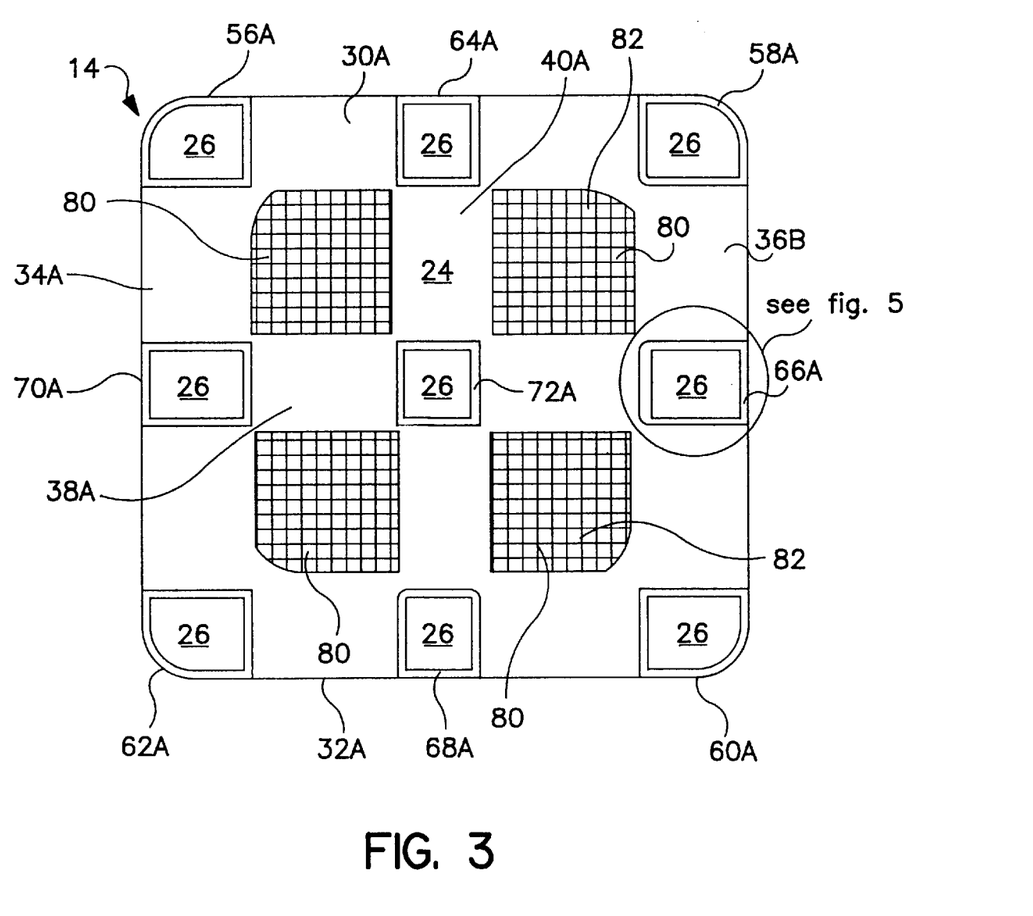
FIG. 3 is a bottom view of the load member of the pallet assembly.

Referring now to FIG. 1, the pallet assembly, generally indicated as 10, is comprised of a molded plastic base member 12 and a load member 14. Such base and load members are generally rectangular in cross-section as illustrated in FIGS. 2 and 3. Additionally there is associated with pallet assembly 10, a plurality of rigid reinforcement members 16 inlaid and recessed in preformed channels formed in the base member 12 as will be more fully explained hereafter. Rigid reinforcement members 16 may be formed of any suitable material including polyester fiberglass or metal or aluminum tubing. The rigid reinforcement member 16 criss cross about the edges and center of the base member 12 and FIG. 1 illustrates a longitudinal rigid reinforcement member 16 and three lateral rigid reinforcement members 16. The base member 12 is generally planar with a lower surface 18 and formed with a plurality of preformed grooves (not shown) on an upper surface 20 as will be more fully discussed with reference to FIG. 2.

The load member 14 is generally planar on an upper surface 22 and is similarly generally planar on a lower surface 24 with a plurality of depending support pillars 26. The plastic pallet assembly 10 illustrated in FIG. 1, comprised of the load member 14 and the base member 12 are each molded in one piece out of suitable grade of thermoplastic material, such as polyolefin or the like.

The base member 12 of the plastic pallet assembly 10, referring now to FIG. 2, is defined by two parallel outer lateral legs 30 and 32 and two parallel outer longitudinal legs 34 and 36 having a lateral cross leg 38 and a longitudinal cross leg 40 parallelly disposed to lateral legs 30 and 32 and longitudinal legs 34 and 36, respectfully. The longitudinal, lateral and cross legs 30 to 40 define open areas 42 in the base member 12.

A plurality of channels are formed in the upper surface 20 of base member 12 in which the reinforcement members 16 are positioned. Two lateral channels 44 and 46 are associated with the lateral legs 30 and 32, respectively and two longitudinal channels 48 and 50 are associated with the longitudinal legs 34 and 36, respectively. Channels 44, 46, 48 and 50 extend from corner to corner and intersect at each corner. A lateral cross leg channel 52 and a longitudinal cross leg channel 54 intersecting at the center of base member 12 and extend radially outwardly on lateral cross leg 38 and longitudinal cross leg 40 to a point proximate to, but not intersecting with the channels 44, 46, 48 and 50.

At each corner of the base member 12, there is formed a recess groove 58, 60, 62, and 64 for positioning a thermoplastic, electromagnetic bonding material corresponding in dimension and width with respect to the support pillars 26 of the load member 14, as will be more fully hereinafter described. At an intermediate point of the lateral legs 30 and 32 and longitudinal legs 34 and 36, there is provided recessed grooves 64, 66, 68, and 70 for positioning a thermoplastic, electromagnetic bonding material dimensioned to the size and thickness of the support pillars 26 which depend from the midpoint sides of load member 14. A recess groove 72 is provided at the intersection or center of the lateral cross leg 38 and longitudinal cross leg 40 for the receipt of thermoplastic, electromagnetic bonding material dimensioned to the periphery of the support pillar 26 depending from the center of load member 14.

Corner recess grooves 56, 58, 60 and 62 are identical in their size and shape and intersect with the respective channels 44, 46, 48 and 50 which accommodate reinforcement members 16. Recess grooves 64, 66, 68 and 70, formed at the intermediate point of the lateral and longitudinal legs are similarly identical to each other and intersect with the respective lateral or longitudinal channels accommodating the reinforcement members 16 and either the lateral or longitudinal cross leg channel, which accommodates a reinforcement member 16.

Referring now to FIG. 3, there is illustrated a bottom view of load member 14 of pallet assembly 10. Load member 14 is generally rectangular shaped and in conformance with the periphery of base member 12 and is defined by lateral legs 30A, 32A, longitudinal legs 34A and 36A and cross legs 38A and 40A. The surface 22 of the load member 14 of the pallet assembly 10 receives a pallet load. The upper surface 22 of the load member is generally planar in nature. In the interest of weight considerations of the pallet assembly itself, the interior areas 80 defined by the lateral, longitudinal and cross legs 30A–40A are formed into a plurality of lattice-like cross members 82 presenting a plurality of apertures 84 in one piece construction in the molding of the load member 14.

Depending from the underside 24 of load member 14 are a plurality of support pillars 26 formed of a hollow, square-shaped wall 90 with integrally formed interior stiffeners and gussets, as will be more fully hereinafter described with reference to FIGS. 5 and 6. For purposes of clarity individual reference numerals will be assigned to pillars 26 for the following discussion. The corner pillars 56A, 58A, 60A and 62A of load member 14 are dimensioned with respect to their side wall 90 shape and thickness to fit within grooves 56, 58, 60, and 62 in base member 12. Intermediate pillars 64A, 66A, 68A and 70A are dimensioned in shape and thickness to fit within the intermediate grooves 64, 66, 68, and 70 on base member 12. Center pillars 72A is dimensioned in shape and thickness to fit within center groove 72 at the midpoint of the cross legs in base member 12.

The pillars 26 differ in the positioning and number of U-shaped slots necessary with respect to each pillar 26 to accommodate the lateral, longitudinal, and cross leg channels 44, 46, 48, 50, 52, and 54 for the reinforcement members 16. As hereinafter discussed, the pillar 26 accommodating grooves in the base member 12 intersect the reinforcement member channels and the type of intersection varies at three distinct locations, the corners, the mid or intermediate points of the sides and the center of the pallet assembly 10.

Figure 4:
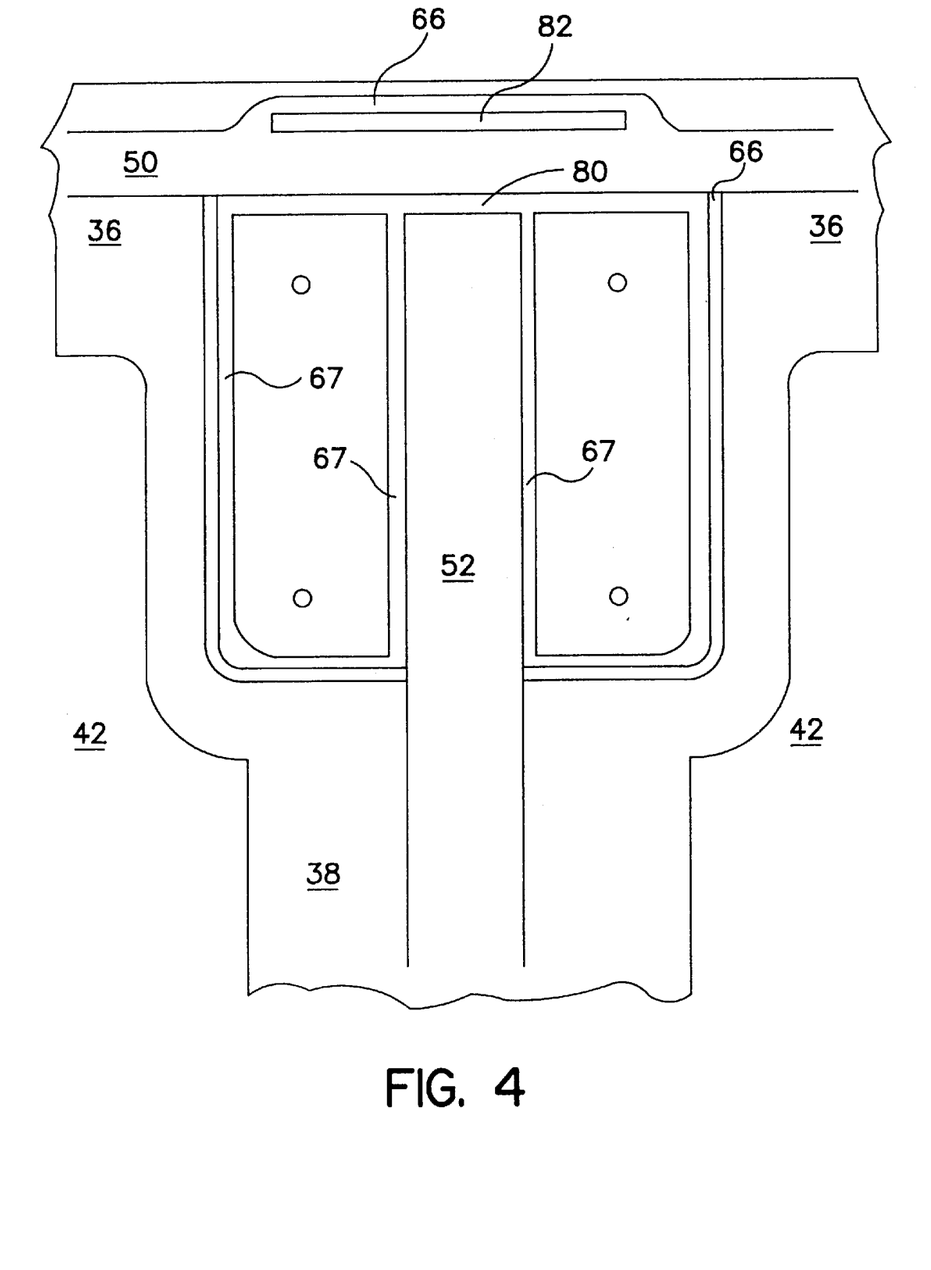
FIG. 4 is an enlarged partial elevational view of Section A of FIG. 2.

Referring now to FIG. 4, there is illustrated the intersection of the lateral cross leg 38 with the longitudinal leg 36. Longitudinal leg member 36 is formed with a longitudinal channel 50 for accommodating a reinforcement member 16 (not shown). As illustrated, the cross leg member 38 is wider at its intersection with the longitudinal leg member 36 and tapers or narrows from longitudinal member 36. This tapering or narrowing permits the sizing of groove 66 for accommodation of support pillar 66A and also to further conserve weight of the pallet assembly 10 in that the initial width of cross leg member 38 as it exists proximate to longitudinal leg member 36 is not required for its entire length. The lateral cross channel 52 for a reinforcement member 16 does not intersect longitudinal channel 50 for a separate reinforcement member 16, but terminates at end wall 80.

In FIG. 4 groove 66 is substantially rectangular in nature with rounded corners except at its intersection with the longitudinal channel 50 for receipt of the reinforcement member 16. The intersection with channel 50 results, in the forming, during the molding process, of a wall 82 serving to define not only a portion of the side wall of channel 50, but also the outermost portion of groove 66 proximate the edge of the base member 12. Similarly, the innermost portion of the groove 66 intersects the cross leg channel 52 at a perpendicular angle. Formed interiorly to and adjacent groove 66 on base member 12 is a raised support surface 67 for cooperation with pillar 66A and in particular with the internal stiffeners 94 and 96 hereinafter discussed.

Figure 5:
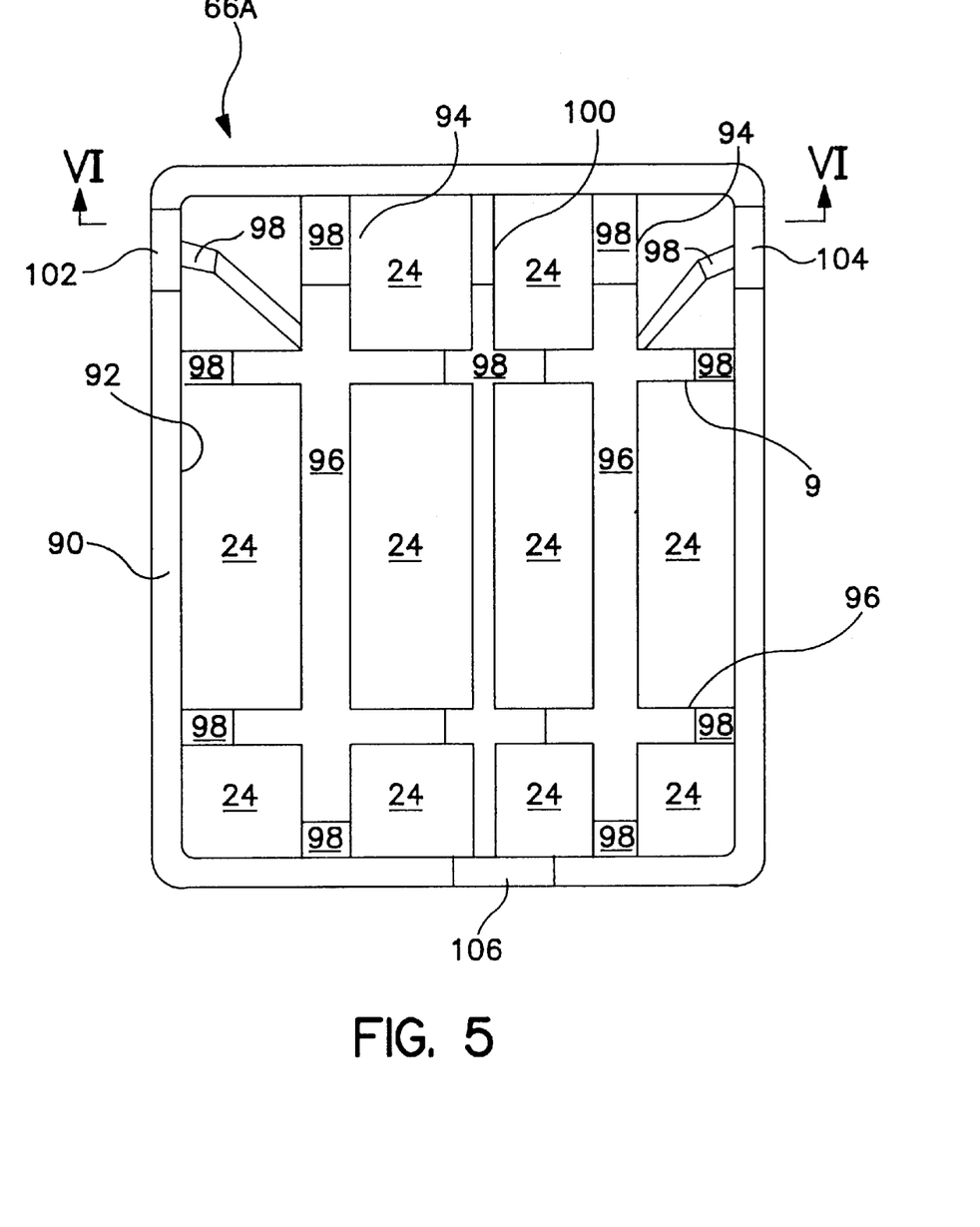
FIG. 5 is an enlarged partial elevational view of Section B of FIG. 3.
Figure 6:
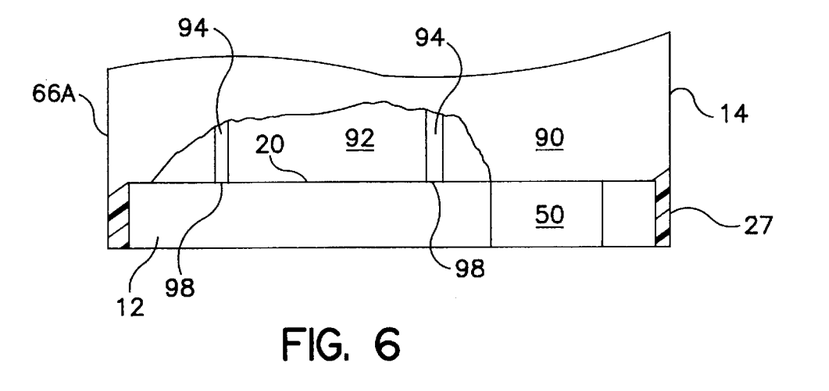
FIG. 6 is a partial sectional side view of the base member taken along the lines VI—VI of FIG. 5.

FIG. 5 is a bottom view of a pillar 66A and similarly situated intermediate pillars 64A, 68A, and 70A to be positioned at the midpoint of the lateral and longitudinal leg members of pallet assembly 10. The support pillar 66A, as well as all other support pillars, depends from the underside 24 of load member 14. Support pillar 66A including wall 90 defining a chamber 92 of support pillar 66A is provided with a plurality of lateral and longitudinal stiffeners 94 and 96, respectively. As illustrated in FIG. 6, stiffeners 94 depend from the underside 24 of load member 14 for a distance at 96 and then depend downwardly along an inner support surface 98 of the peripheral wall 90 to engage the corresponding support surface 67 of base member 12 of longitudinal leg 36 and cross leg member 38. At least one longitudinal stiffener 100 terminates at such inner surface 98. The inner support surface 98 of all stiffeners engage the corresponding support surface 67 of the base member 12 at the intersection of the longitudinal member 36 and the cross leg member 38 to provide additional support for the surface 22 of the load member 14 of the pallet assembly 10 when under load.

Support pillar 66A is formed with slots 102, 104 and 106 in peripheral wall 90. Slots 102 and 104 are in opposing relationship of the peripheral side wall 90 and are in alignment. The slots 102 and 104 span channel 50 in the longitudinal member 36 to allow for accommodation of the reinforcement member 16 disposed in channel 50 prior to positioning of support pillar 66A in groove 66 together with the thermoplastic electromagnetic bonding material. The slot 106 accommodates the reinforcement member 16 in cross member channel 52 of the lateral cross member 38 which reinforcement member 16 is positioned in channel 52 subsequent to the positioning of the thermoplastic electromagnetic bonding material in groove 66.

Support pillar 66A and intermediate pillars 64A, 68A, and 70A differ from the corner support pillars and center support pillars, 56A, 58A, 60A, 62A, and 72A, respectively, in the manner in which the slots in the peripheral wall are formed in order to accommodate the reinforcement members 16. It will be understood that the corner pillars 56A, 58A, 60A, and 62A require slots in the peripheral wall 90 at approximately right angles to each other (adjacent side walls) since the reinforcement member accommodating channels in the corners are at right angles to each other. Support pillar 72A requires a slot in each side wall in that the channels 52 and 54 for the reinforcement member 16 intersect beneath support pillar 72A when load member 14 is positioned on the base member 12.

In manufacture of a plastic pallet assembly 10 of the present invention, there is positioned within pillar receiving grooves 56, 58, 60, 62, 64, 66, 68, 70, and 72 a thermoplastic electromagnetic bonding material. Such material may be in the form of a premolded ring-shaped gasket member or a continuous coil, cut to length for insertion or molten form. Such is illustrated with respect to FIGS. 7 through 9.

Figure 7:
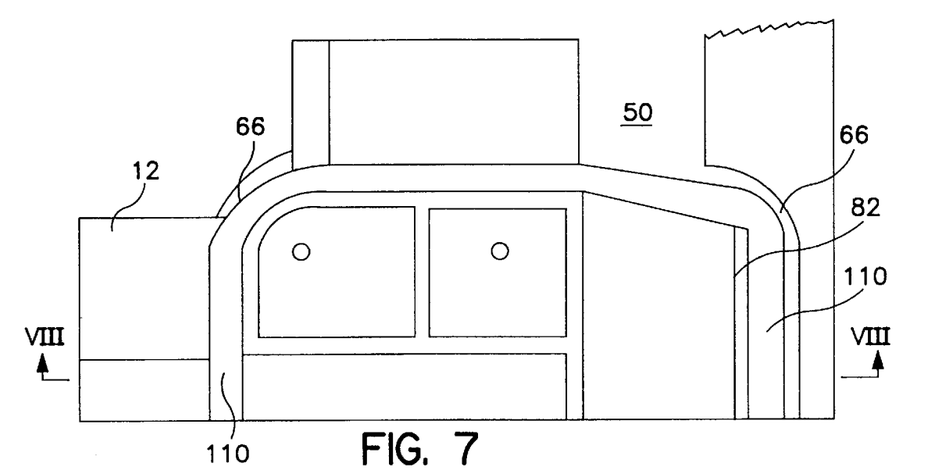
FIG. 7 is a partial top view of the pillar receiving portion of the base member.
Figure 8:
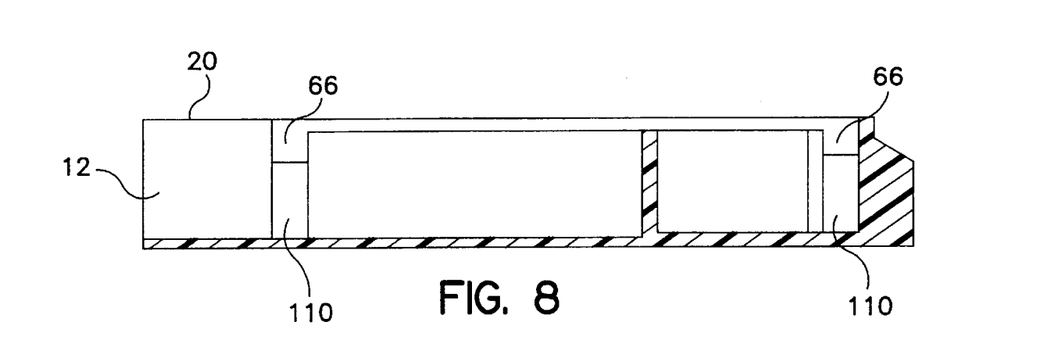
FIG. 8 is a sectional side view of the pillar receiving portion of the base member taken along the lines VIII of VIII of FIG. 7.
Figure 9:
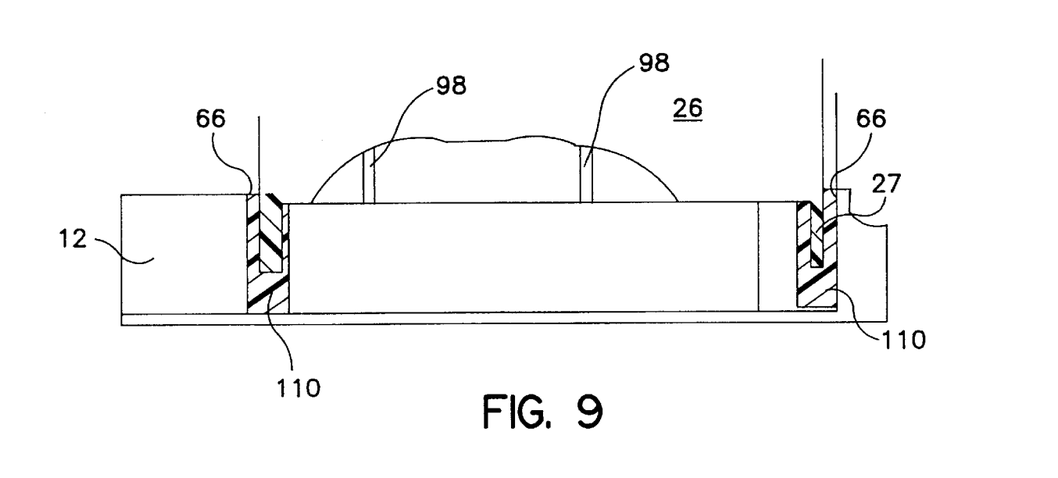
FIG. 9 is a partial sectional side view of the pillar member and pillar receiving groove of the base member.

FIG. 7 illustrates a partial top view of pillar receiving groove 66 in the base member 12, while FIG. 8 is a sectional side view of FIG. 7 taken along lines VIII—VIII of FIG. 7. FIG. 9 is a partial sectional side view of the pillar member and pillar receiving groove 66 in cooperation with the thermoplastic, electromagnetic bonding material. The thermoplastic, electromagnetic material in the form of a ring shaped member 110 extends completely about the pillar receiving groove 66. A similar ring shaped member 110 is positioned in each remaining pillar receiving groove and the reinforcement member 16 (not shown) are positioned in their respective channels 44, 46, 48, 50, 52, and 54. Load member 14 and depending pillars 26 are then positioned on base member 12 with the lower end 27 of each support pillar engaging the respective pillar receiving groove and the thermoplastic, electromagnetic material 110 positioned there as illustrated in FIG. 9.

Figure 10:
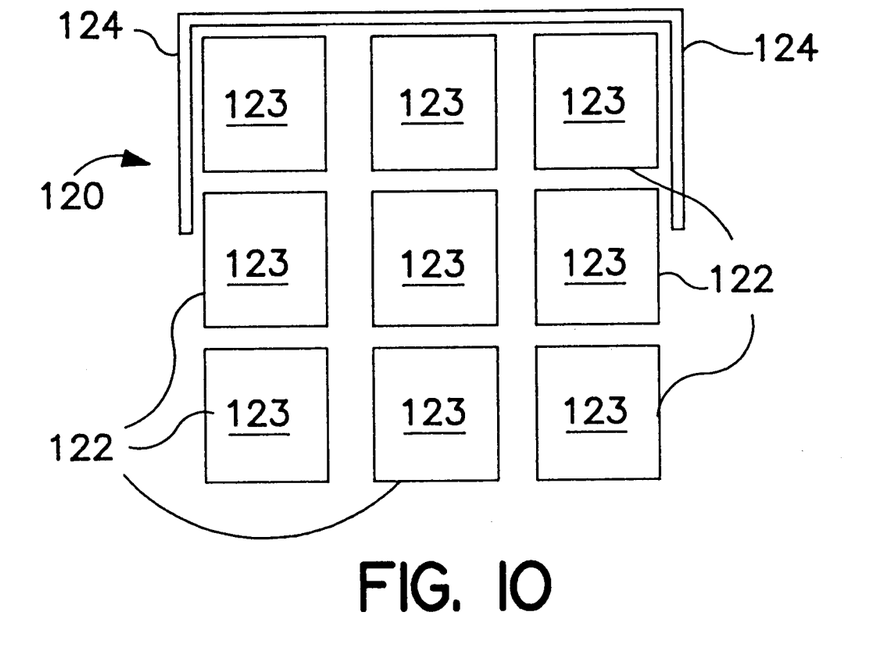
FIG. 10 is a top schematic view of the apparatus for setting the electromagnetic bonding material.
Figure 11:
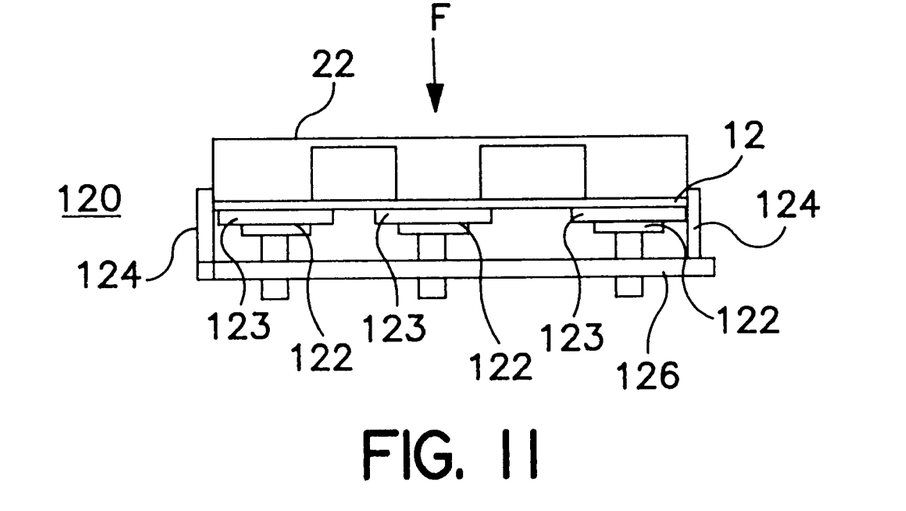
FIG. 11 is an end view of the apparatus for setting the electromagnetic bonding material.

The pallet assembly is then placed into a welding machine schematically illustrated in FIGS. 10 and 11, FIG. 10 being a top view and FIG. 11 an end view. The welding machine 120 is comprised of separate and adjustable coils 122 for each pillar and having an upper planar surface 123 for support of the pallet. With respect to the pallet described heretofore, the coils are positioned such that they would be directly beneath and in alignment with the pillar receiving grooves of base member 12. A series of guides 124 would assure the correct positioning of the pallet assembly within the welder. Once positioned, a high frequency alternating current from a source (not shown) is applied to the coil 122 to establish an electromagnetic field through the thermoplastic electromagnetic material 110 to thereby raise the temperature of the thermoplastic material to its fusion temperature as a result of heat losses (eddy current and hysteresis) from the thermoplastic electromagnetic material such as disclosed in copending application U.S. Ser. No. 08/848,306 filed Apr. 3, 1997 hereby incorporated by reference.

Simultaneously a force (as indicated by the arrows "F") is applied downwardly on the planar load surface 22 of load member 14 thereby forcing the lower end 27 of the respective support pillars into the respective pillar receiving grooves in contact with the molten electromagnetic material 110 thereby to form a bond or weld between base member 12 and load member 14 at each pillar, the bond or weld actually existing between the respective pillar receiving groove and the lower end 27 of the respective support pillar.

The welding machine 120 as disclosed and illustrated in FIGS. 10 and 11 contains nine coils for the pallet assembly as disclosed herein. The nine coils can be energized from a single source of alternating current or from multiple sources of alternating current to give the operator a degree of flexibility with respect to power requirements and a time of operations. Additionally, the coils may be adjusted by means of slide bar 126 together with the guides 124 to accommodate a pallet assembly which may have fewer than nine support pillars and which may vary in size from the standard pallet assembly heretofore described.

While the present invention has been described with reference to its preferred embodiment, it will be appreciated by those of ordinary skill in the art that various changes can be made to the apparatus in the process without departing it from the basic spirit of the scope of the invention.

What is claimed:

1. A plastic pallet assembly which comprises:
    a plastic base member having a plurality of grooves formed therein and a plurality of lateral and longitudinal channels in which are positioned reinforcing stiffeners affixed to said base member by a thermoplastic electromagnetic material;
    a plastic load member having a flat load surface and a plurality of support pillars depending therefrom, each of said plurality of support pillars having a peripheral edge conforming to said grooves in said base member, each of said plurality of support pillars being affixed within said plurality of grooves in said base member by said thermoplastic, electromagnetic material positioned within each said plurality of said grooves.

2. The plastic pallet assembly in accordance with claim 1 wherein said base member comprises corner, intermediate and center pillar receiving grooves and said load member is formed with corner, intermediate and center pillars.

3. A method for forming a pallet assembly which comprises:
    forming a base member having a plurality of grooves formed therein and a plurality of intersecting lateral and longitudinal channels in which are positioned reinforcing stiffeners affixed to said base member by a thermoplastic electromagnetic material;
    forming a load member including a flat load surface and a plurality of depending support pillars having peripheral edges conforming to said plurality of grooves in said base member;
    positioning said thermoplastic electromagnetic material in each of said plurality of grooves;
    positioning said support pillars of said load member in said grooves of said base member;
    subjecting said thermoplastic electromagnetic material to an electromagnetic field of sufficient power and frequency to inductively heat said thermoplastic material and cause said material to flow within said grooves of said base member;
    simultaneously forcing said load member against said base member to effect spacial relationships between said members;
    terminating said electromagnetic field to affect bonding of said load member to said base member.

* * * * *